US012585951B2

(12) United States Patent
Das et al.

(10) Patent No.: US 12,585,951 B2
(45) Date of Patent: Mar. 24, 2026

(54) METHOD AND ELECTRONIC DEVICE FOR GENERATING OPTIMAL NEURAL NETWORK (NN) MODEL

(71) Applicant: SAMSUNG ELECTRONICS CO., LTD., Suwon-si (KR)

(72) Inventors: Mayukh Das, Bengaluru (IN); Brijraj Singh, Bengaluru (IN); Pradeep Nelahonne Shivamurthappa, Bengaluru (IN); Aakash Kapoor, Bengaluru (IN); Rajath Elias Soans, Bengaluru (IN); Soham Vijay Dixit, Bengaluru (IN); Sharan Kumar Allur, Bengaluru (IN); Venkappa Mala, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 665 days.

(21) Appl. No.: 18/082,305

(22) Filed: Dec. 15, 2022

(65) Prior Publication Data

US 2023/0127001 A1     Apr. 27, 2023

Related U.S. Application Data

(63) Continuation of application No. PCT/KR2022/009631, filed on Jul. 5, 2022.

(30) Foreign Application Priority Data

Jul. 6, 2021     (IN) .............................. 202141030362
Jun. 18, 2022     (IN) .............................. 202141030362

(51) Int. Cl.
*G06N 3/082*          (2023.01)
*G06N 3/04*          (2023.01)
(Continued)

(52) U.S. Cl.
CPC ........... *G06N 3/082* (2013.01); *G06V 10/776* (2022.01); *G06V 10/82* (2022.01); *G06V 40/172* (2022.01);
(Continued)

(58) Field of Classification Search
CPC ...... G06N 3/082; G06N 3/0464; G06N 3/092; G06N 3/08; G06N 3/04; G06V 10/776; G06V 10/82; G06V 40/172
See application file for complete search history.

(56) References Cited

U.S. PATENT DOCUMENTS 11,100,222 B2 *     8/2021     Joye ...................... G06F 21/554
11,562,200 B2     1/2023     Barad et al.
(Continued)

FOREIGN PATENT DOCUMENTS

CN          111522657 A          8/2020
CN          111860796 A          10/2020
(Continued)

OTHER PUBLICATIONS

Li et al., NPL ("Dynamic Dual Gating Neural Networks" Published 2021 By IEEE Total 10 Pages (Year: 2021).*
(Continued)

*Primary Examiner* — Quoc A Tran
(74) *Attorney, Agent, or Firm* — Sughrue Mion, PLLC

(57)          ABSTRACT

A method for generating an optimal neural network (NN) model may include determining intermediate outputs of the NN model by passing an input dataset through each intermediate exit gate of the plurality of intermediate exit gates, determining an accuracy score for each intermediate exit gate of the plurality of intermediate exit gates based on a comparison of the final output of the NN model with the intermediate output, identifying an earliest intermediate exit gate that produces the intermediate output closer to the final
(Continued)

output based on the accuracy score, and generating the optimal NN model by removing remaining layers of the plurality of layers and remaining intermediate exit gates of the plurality of intermediate exit gates located after the determined earliest intermediate exit gate.

17 Claims, 16 Drawing Sheets

(51) Int. Cl.

| | |
|---|---|
| *G06N 3/0464* | (2023.01) |
| *G06N 3/08* | (2023.01) |
| *G06N 3/092* | (2023.01) |
| *G06V 10/776* | (2022.01) |
| *G06V 10/82* | (2022.01) |
| *G06V 40/16* | (2022.01) |

(52) U.S. Cl.
CPC ............. *G06N 3/04* (2013.01); *G06N 3/0464* (2023.01); *G06N 3/08* (2013.01); *G06N 3/092* (2023.01)

(56) References Cited

U.S. PATENT DOCUMENTS

| | | | |
|---|---|---|---|
| 11,669,711 | B2 | 6/2023 | Xie et al. |
| 2020/0143045 | A1 | 5/2020 | Joye et al. |
| 2020/0160494 | A1 | 5/2020 | Hwang et al. |
| 2021/0012178 | A1 | 1/2021 | Venkatesh et al. |
| 2021/0056357 | A1 | 2/2021 | Zhang et al. |

FOREIGN PATENT DOCUMENTS

| | | |
|---|---|---|
| CN | 113011386 A | 6/2021 |
| CN | 110852369 B2 | 9/2022 |

OTHER PUBLICATIONS

Communication issued on Jan. 29, 2025 by the Intellectual Property India for Indian Patent Application No. 202141030362.

Communication issued on Jun. 4, 2024 by the European Patent Office for European Patent Application No. 22837921.0.

Examination Report dated Mar. 7, 2023 issued by Intellectual Property India in Indian Patent Application No. 202141030362.

Liang, T., et al., "Pruning and Organization for Deep Neural Network Acceleration: A Survey", arXiv:2101.09671v1 [cs.CV], Jan. 24, 2021, pp. 1-39.

Teerapittayanon et al., "BranchyNet: Fast Inference via Early Exiting from Deep Neural Networks," arXiv:1709.01686v1 [cs.NE], Sep. 6, 2017, (7 pages).

Panda et al., "Conditional Deep Learning for Energy-Efficient and Enhanced Pattern Recognition," arxiv, Sep. 29, 2015, (6 pages).

Huang et al., "Multi-Scale Dense Networks for Resource Efficient Image Classification," arXiv:1703.09844v5 [cs.LG], Jun. 7, 2018 (14 pages).

International Search Report (PCT/ISA/210) issued Oct. 24, 2022 by International Search Authority in International Application No. PCT/KR2022/009631.

Written Opinion (PCT/ISA/237) issued Oct. 24, 2022 by the International Searching Authority in International Application No. PCT/KR2022/009631.

* cited by examiner

FIG. 3A

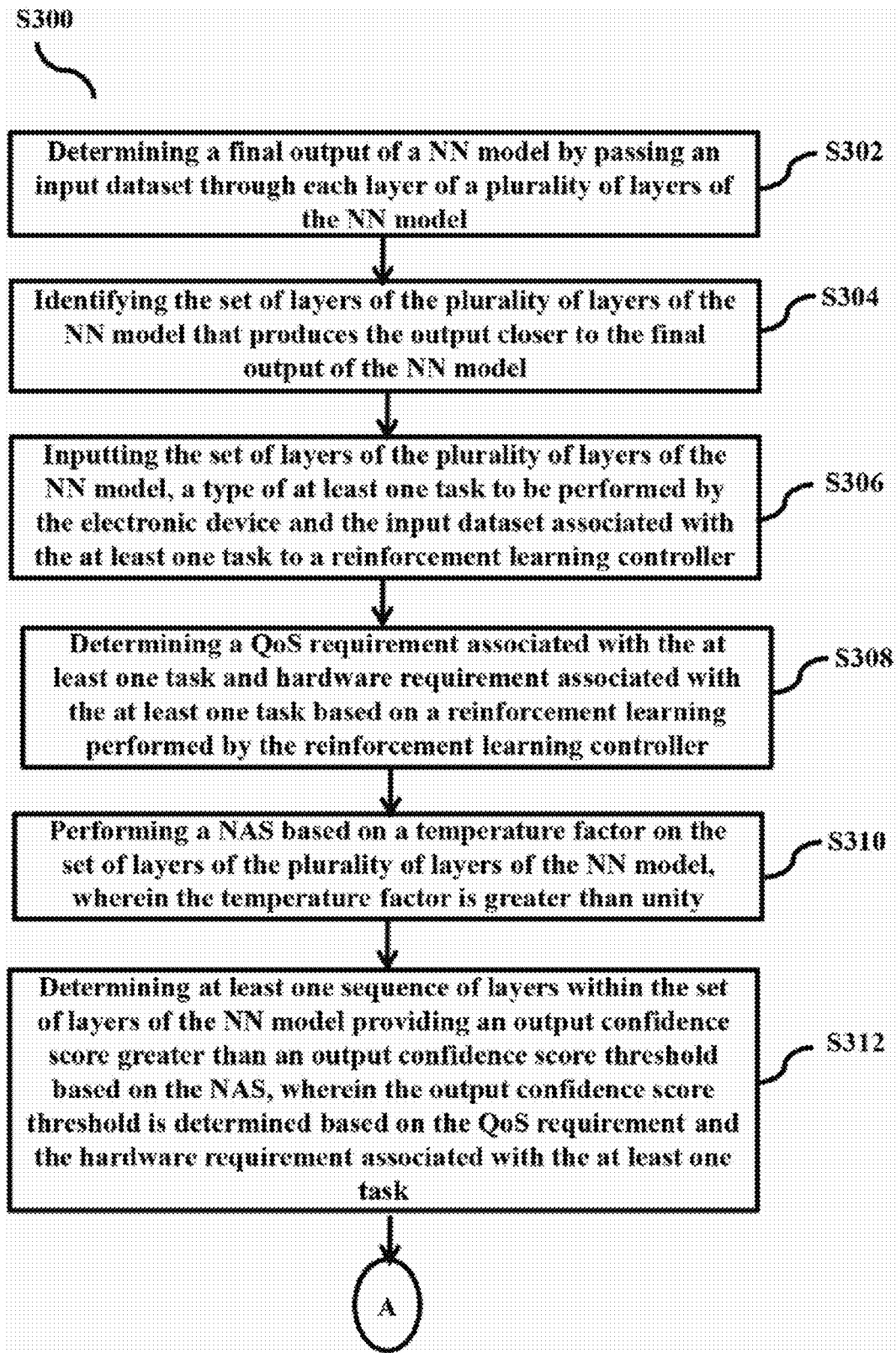

S300

S302 — Determining a final output of a NN model by passing an input dataset through each layer of a plurality of layers of the NN model S304 — Identifying the set of layers of the plurality of layers of the NN model that produces the output closer to the final output of the NN model S306 — Inputting the set of layers of the plurality of layers of the NN model, a type of at least one task to be performed by the electronic device and the input dataset associated with the at least one task to a reinforcement learning controller S308 — Determining a QoS requirement associated with the at least one task and hardware requirement associated with the at least one task based on a reinforcement learning performed by the reinforcement learning controller S310 — Performing a NAS based on a temperature factor on the set of layers of the plurality of layers of the NN model, wherein the temperature factor is greater than unity S312 — Determining at least one sequence of layers within the set of layers of the NN model providing an output confidence score greater than an output confidence score threshold based on the NAS, wherein the output confidence score threshold is determined based on the QoS requirement and the hardware requirement associated with the at least one task

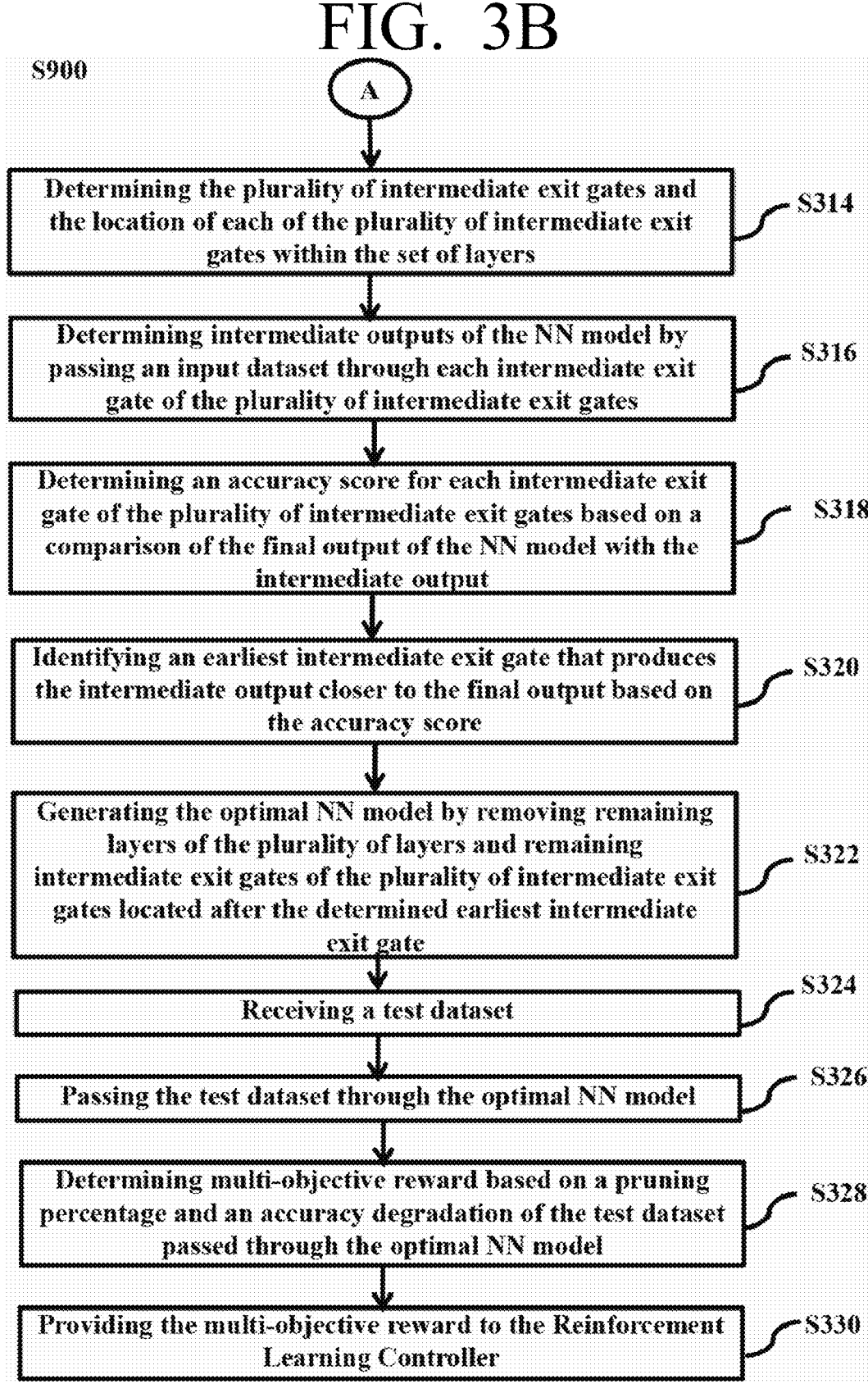

S900

A

Determining the plurality of intermediate exit gates and the location of each of the plurality of intermediate exit gates within the set of layers — S314

Determining intermediate outputs of the NN model by passing an input dataset through each intermediate exit gate of the plurality of intermediate exit gates — S316

Determining an accuracy score for each intermediate exit gate of the plurality of intermediate exit gates based on a comparison of the final output of the NN model with the intermediate output — S318

Identifying an earliest intermediate exit gate that produces the intermediate output closer to the final output based on the accuracy score — S320

Generating the optimal NN model by removing remaining layers of the plurality of layers and remaining intermediate exit gates of the plurality of intermediate exit gates located after the determined earliest intermediate exit gate — S322

Receiving a test dataset — S324

Passing the test dataset through the optimal NN model — S326

Determining multi-objective reward based on a pruning percentage and an accuracy degradation of the test dataset passed through the optimal NN model — S328

Providing the multi-objective reward to the Reinforcement Learning Controller — S330

S1200

S1400

A sequence of video frames

Frame n-1　　　　　　　　　Frame n

Similar information
(partially redundant)

Independent information

No change in information
(fully redundant)

METHOD AND ELECTRONIC DEVICE FOR GENERATING OPTIMAL NEURAL NETWORK (NN) MODEL

CROSS-REFERENCE TO RELATED APPLICATION

This application is a bypass continuation of International Application No. PCT/KR2022/009631, filed on Jul. 5, 2022, which is based on and claims priority to Indian Provisional Patent Application 202141030362 filed on Jul. 6, 2021, and Indian Complete Patent Application 202141030362 filed on Jun. 18, 2022, in the Indian Patent Office, the disclosures of which are incorporated herein by reference in their entireties.

BACKGROUND

Field

The present disclosure relates to a field of a data driven model method and system, and more particularly related to a method and an electronic device for generating an optimal neural network (NN) model.

Description of Related Art

Unprecedented success of deep neural networks (DNNs) over the last decade, especially in a complex vision, natural language processing (NLP) and audio/video processing tasks can primarily be attributed to stacked transformation functions in deep models that automatically generate increasingly complex features, making DNNs universal approximators. Incremental gains to state-of-the-art DNN models have come at the cost of increased complexity. Consequently, there has been a major focus on improving model efficiency and designing models that are light, quick, and consume less power to make them suitable for applications in an electronic device (e.g., embedded systems, edge devices, and internet of things or the like). These targets are typically achieved by model compression techniques like pruning, quantization, and model distillation. In existing methods and systems, the method can be used for selectively processing regions of interest in video frames to leverage the redundancy in information across consecutive frames. However, all frames, irrespective of the kind or amount of information will be processed through all layers of an artificial intelligence (AI) model, and may require large computational resource and power.

SUMMARY

One or more embodiments of the disclosure provide a method and an electronic device for generating an optimal neural network (NN) model.

Further, one or more embodiments of the disclosure provide a method and an apparatus for identifying a first set of layers (i.e., saliency layers) among a plurality of layers of the NN model that produce an output closer to a final output of the NN model and providing the NN model with the saliency layers to Neural Architecture Search (NAS) framework for determining an optimal number and positions of intermediate exit gates for placement in the NN model.

Still further, one or more embodiments of the disclosure provide a method and an apparatus for computing an accuracy of each intermediate output by comparing the intermediate output to the final output of the NN model to identify earliest intermediate exit gate that produces the intermediate output closer to the final output and then remove/prune all the layers and intermediate exit gates post identified earliest exit gate.

Still further, one or more embodiments of the disclosure provide a method and an apparatus for determining a model confidence and its application in regulating the exit decisions at exit gates, and using exit-augmented model for model compression by layer pruning, yielding similar accuracy with lower computational costs.

According to an aspect of the disclosure, a method for generating a neural network (NN) model by an electronic device, may include: identifying a set of layers, which produces an output whose difference from a final output of the NN model is less than a preset threshold, among a plurality of layers of the NN model; determining a plurality of intermediate exit gates and a location of each of the plurality of intermediate exit gates within the set of layers; determining intermediate outputs of the NN model by passing an input dataset through each of the plurality of intermediate exit gates; determining an accuracy score for each of the plurality of intermediate exit gates based on a comparison of the final output of the NN model with each of the intermediate outputs; identifying an earliest intermediate exit gate whose accuracy score is within a preset accuracy score, among the plurality of intermediate exit gates; and generating the NN model by removing or dropping remaining layers of the plurality of layers and remaining intermediate exit gates of the plurality of intermediate exit gates located after the determined earliest intermediate exit gate.

The identifying the first set of layers of the plurality of layers of the NN model may include: determining the final output of the NN model by passing an input dataset through each layer of the plurality of layers of the NN model; and identifying the set of layers which produces the output whose difference from the final output of the NN model is less than the preset threshold, among the plurality of layers of the NN model.

The determining the plurality of intermediate exit gates and the location of each of the plurality of intermediate exit gates within the set of layers may include: determining a quality of service (QoS) requirement associated with at least one task and a hardware requirement associated with the at least one task based on a reinforcement learning; performing a neural architecture search (NAS) based on a temperature factor on the set of layers of the plurality of layers of the NN model, wherein the temperature factor is greater than unity; determining, at least one sequence of layers within the set of layers of the NN model providing an output confidence score greater than an output confidence score threshold based on the NAS, wherein the output confidence score threshold is determined based on the QoS requirement and the hardware requirement associated with the at least one task; and determining the plurality of intermediate exit gates and the location of each of the plurality of intermediate exit gates within the set of layers.

The method may further include: receiving a test dataset; passing the test dataset through the NN model; and determining a multi-objective reward based on a pruning percentage and an accuracy degradation of the test dataset passed through the NN model.

The earliest intermediate exit gate may be the intermediate exit gate in the set of layers providing the highest accuracy score, among the plurality of intermediate exit gates.

The method may further include: receiving an image and a request for performing facial recognition; determining whether the image includes the facial image; and identifying the earliest intermediate exit gate based on a determination of whether the image includes a facial image.

A number of the remaining layers and a number of the remaining intermediate exit gates to be removed or dropped may change according to the determination of whether the image includes the facial image.

According to another aspect of the disclosure, an electronic device for generating a neural network (NN) model, may include: at least one memory storing instructions; and at least one processor configured to execute the instructions to: identify a set of layers, which produces an output whose difference from a final output of the NN model is less than a preset threshold, among a plurality of layers of a NN model; determine a plurality of intermediate exit gates and a location of each of the plurality of intermediate exit gates within the set of layers; determine intermediate outputs of the NN model by passing an input dataset through each intermediate exit gate of the plurality of intermediate exit gates; determine an accuracy score for each of the plurality of intermediate exit gates based on a comparison of the final output of the NN model with each of the intermediate outputs; identify an earliest intermediate exit gate whose accuracy score is within a preset accuracy score, among the plurality of intermediate exit gates; and generate the NN model by removing or dropping remaining layers of the plurality of layers and remaining intermediate exit gates of the plurality of intermediate exit gates located after the determined earliest intermediate exit gate.

The at least one processor may be further configured to execute the instructions to: determine the final output of the NN model by passing an input dataset through each layer of the plurality of layers of the NN model; and identify the set of layers, which produces the output whose difference from the final output of the NN model is less than the preset threshold, among the plurality of layers of the NN model.

The at least one processor may be further configured to execute the instructions to: determine a quality of service (QoS) requirement associated with a at least one task and a hardware requirement associated with the at least one task based on a reinforcement learning performed; perform a neural architecture search (NAS) based on a temperature factor on the set of layers of the plurality of layers of the NN model, wherein the temperature factor is greater than unity; determine at least one sequence of layers within the set of layers of the NN model providing an output confidence score greater than an output confidence score threshold based on the NAS, wherein the output confidence score threshold is determined based on the QoS requirement and the hardware requirement associated with the at least one task; and determine the plurality of intermediate exit gates and the location of each of the plurality of intermediate exit gates within the set of layers.

The at least one processor is further configured to execute the instructions to: receive a test dataset; pass the test dataset through the NN model; and determine a multi-objective reward based on a pruning percentage and an accuracy degradation of the test dataset passed through the NN model.

The earliest intermediate exit gate may be the intermediate exit gate in the set of layers providing the highest accuracy score, among the plurality of intermediate exit gates.

The at least one processor may be further configured to execute the instructions to: receive an image and a request for performing facial recognition; determine whether the image includes a facial image; and identify the earliest intermediate exit gate based on a determination of whether the image includes the facial image.

A number of the remaining layers and a number of the remaining intermediate exit gates to be removed or dropped may change according to the determination of whether the image includes the facial image.

According to another aspect of the disclosure, there is provided a non-transitory computer-readable storage medium storing a program that is executable by at least one processor to perform the method for generating the neural network (NN) model.

BRIEF DESCRIPTION OF THE DRAWINGS

The above and/or other aspects will be more apparent by describing certain example embodiments, with reference to the accompanying drawings, in which:

FIG. 3A and FIG. 3B are flow charts illustrating a method for generating the optimal neural network model, according to the embodiments as disclosed herein;

DETAILED DESCRIPTION

Figure 1:
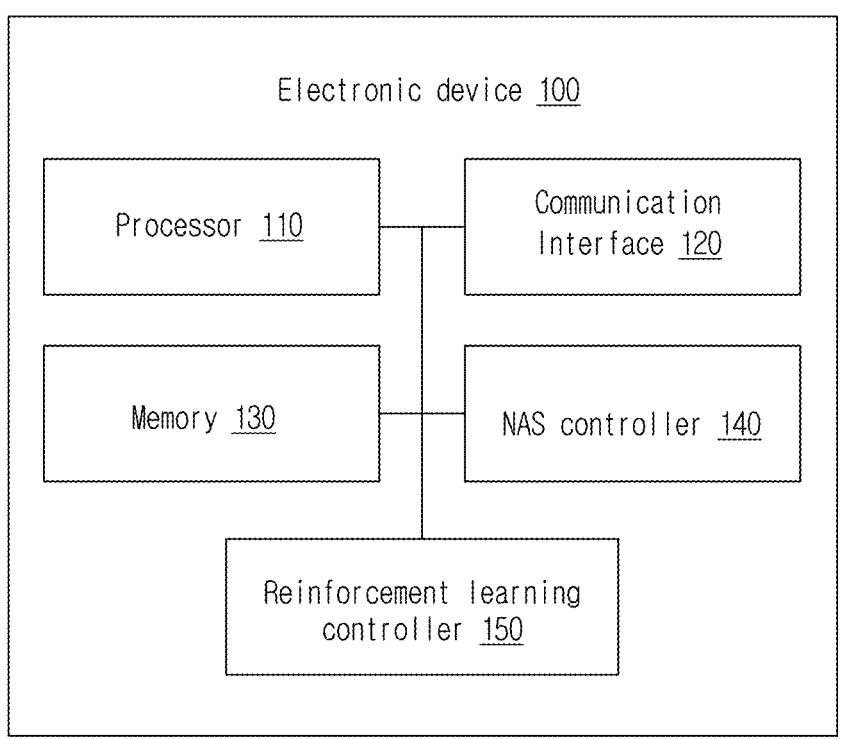
FIG. 1 shows various hardware components of an electronic device for generating an optimal neural network model, according to the embodiments as disclosed herein.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein achieve a method for generating an optimal NN model by an electronic device. The method includes identifying, by the electronic device, a set of layers of a plurality of layers of a NN model, where the set of layers produces an output closer to a final output of the NN model. Further, the method includes determining, by the electronic device, a plurality of intermediate exit gates and a location of each of the plurality of intermediate exit gates within the set of layers. Further, the method includes determining, by the electronic device, intermediate outputs of the NN model by passing an input dataset through each intermediate exit gate of the plurality of intermediate exit gates. Further, the method includes determining, by the electronic device, an accuracy score for each intermediate exit gate of the plurality of intermediate exit gates based on a comparison of the final output of the NN model with the intermediate output. Further, the method includes identifying, by the electronic device, an earliest intermediate exit gate that produces the intermediate output closer to the final output based on the accuracy score. Further, the method includes generating, by the electronic device, the optimal NN model by removing remaining layers of the plurality of layers and remaining intermediate exit gates of the plurality of intermediate exit gates located after the determined earliest intermediate exit gate.

The method can be used to provide an enhanced Quality of Experience (QoE) to the electronic device while interacting with any DNN powered use-cases. The method according to embodiments can be used to attach exit blocks and use the exit blocks to prune the entire model. The method uses a NAS to create optimally sized exit blocks and the optimal number and placement of exit blocks. The method can be used for optimal placement of early exit gates in the NN model and layer pruning that preserves accuracy. The optimized AI model generated using the method according to embodiments can do inference five times faster. The method according to embodiments can be used to assist in creating the AI models that are faster, lighter, consume lower power and maintain accuracy.

Unlike the conventional methods and systems, the method according to embodiments allows a fast face recognition for unlocking a device, if exposed with a clear and front face with an easy pose. A frame without a face will be processed up to the first exit gate therefore computation time incurred because of processing irrelevant frames will be saved.

Unlike the conventional methods and systems, the method according to embodiments provides faster image processing. Inference related computation time will be allotted to each sample as per the demand of the sample (high demand for complex samples, low demand for easy samples), which will speed up the process of image processing such as deblurring, white balancing, contrast stretching, segmentation, object identification, classification, segmentation, etc.

Unlike the conventional methods and systems, the method provides faster prediction in keyboard applications. A model with the intermediate exit applied for natural language processing (NLP), will help in fast inferencing through text data that helps in faster prediction in keyboard applications.

The method according to embodiments also provides improved battery life for the electronic device. The battery life is improved for the end user due to reduction in the number of computations and thus saving energy in AI use-cases. Also, an improved time to market is available by automatically designing the efficient models.

The method according to embodiments also provides thermal effect reduction for end users due to less computation per frame. Further, the method also saves storage space for end users due to smaller AI models produced by pruning.

The NAS based designing of a neural architecture is enabled with multiple exit points. The NAS based designing of a neural architecture provides the position of the exit points in the neural architecture in a way that even the first exit point reaches good enough accuracy. The NAS based designing of the neural architecture further prunes model layers within a certain threshold of accuracy and returns as reward a multi-objective score composed of model accuracy and pruning percentage. The proposed NAS based designing develops a neural architecture specific to the execution device environment to achieve best possible performance according to embodiments. The NAS based developed neural architecture is specific to task (use-case) hence, it is the most optimal architecture.

Based on the method according to embodiments, the NAS powered intermediate exit is expected to have the most optimal exit gates, which will save the ample amount of load and computations. The proposed method provides the faster response by the AI models compare to existing state of arts. Based on the proposed method, expert intervention and time consumed for finding optimal exit points is reduced. The proposed method provides the faster personalization effect to end users, as these exits would further get trained as part of on device learning. The accuracy-preserving pruning yields similar quality results with significantly lower space and time requirements.

The method according to embodiments can be used to eliminate manual tuning of exit gates by combined training and solve the exit gate placement optimization using the neural architecture search. The method according to embodiments can be used to adopt Softmax with temperature scaling to ensure that the confidence values reflect the true confidence in a closer fashion.

Referring now to the drawings and more particularly to FIGS. 1 through 14, where similar reference characters denote corresponding features consistently throughout the figures, there are shown preferred embodiments.

FIG. 1 shows various hardware components of an electronic device (100) for generating an optimal neural network model, according to the embodiments as disclosed herein. The electronic device (100) can be, for example, but not limited to a cellular phone, a smart phone, a Personal Digital Assistant (PDA), a tablet computer, a laptop computer, an Internet of Things (IoT), embedded systems, edge devices, or the like. In an embodiment, the electronic device (100) includes a processor (110), a communication interface (120), a memory (130), a NAS controller (140) and a reinforcement learning controller (150). The processor (110) is coupled with the communication interface (120), the memory (130), the NAS controller (140) and the reinforcement learning controller (150).

According to embodiments of the disclosure, the NAS controller (140) and the reinforcement learning controller (150) may be implemented as part of the processor (110).

The NAS controller (140) determines a final output of the NN model by passing an input dataset through each layer of the plurality of layers of the NN model and identifies the set of layers of the plurality of layers of the NN model that produces the output close to the final output of the NN model. The NAS controller (140) may determine that the output of the set of layers is close to the final output of the NN model when a difference between the output of the set of layers and the final output of the NN model is less than a preset threshold.

Further, the NAS controller (140) inputs the set of layers of the plurality of layers of the NN model, a type of at least one task to be performed by the electronic device (100) and the input dataset associated with the at least one task (e.g., image processing to recognize a face to unlock an electronic device) to the reinforcement learning controller (150). Based on a reinforcement learning performed by the reinforcement learning controller (150), the NAS controller (140) determines a quality of service (QoS) requirement associated with the at least one task and hardware requirement associated with the at least one task. Further, the NAS controller (140) performs the NAS based on a temperature factor on the set of layers of the plurality of layers of the NN model. The temperature factor is greater than unity. Based on the NAS, the NAS controller (140) determines at least one sequence of layers within the set of layers of the NN model providing an output confidence score greater than an output confidence score threshold. The output confidence score threshold is determined based on the QoS requirement and the hardware requirement associated with the at least one task. Further, the NAS controller (140) determines the plurality of intermediate exit gates and the location of each of the plurality of intermediate exit gates within the set of layers.

Further, the NAS controller (140) determines intermediate outputs of the NN model by passing an input dataset through each intermediate exit gate of the plurality of intermediate exit gates. Further, the NAS controller (140) determines an accuracy score for each intermediate exit gate of the plurality of intermediate exit gates based on a comparison of the final output of the NN model with the intermediate output. Based on the accuracy score, the NAS controller (140) identifies an earliest intermediate exit gate that produces the intermediate output close to the final output. The earliest intermediate exit gate is the intermediate exit gate in the at least one sequence of layers providing the highest accuracy score. Further, the NAS controller (140) generates the optimal NN model by removing remaining layers of the plurality of layers and remaining intermediate exit gates of the plurality of intermediate exit gates located after the determined earliest intermediate exit gate.

Further, the NAS controller (140) receives a test dataset and passes the test dataset through the optimal NN model. Further, the NAS controller (140) determines the multi-objective reward based on a pruning percentage and an accuracy degradation of the test dataset passed through the optimal NN model. Further, the NAS controller (140) provides the multi-objective reward to the reinforcement learning controller (150).

In an example, in order to configure/design the optimal neural network model, the following operations used for designing a neural architecture search, analyzing and augmenting baseline model architectures to allow for intermediate exits, and real-time intermediate exit criteria.

Neural Architecture Search: Given a baseline model M (which may be pre-stored in the electronic device 100), the proposed method augments it by providing tunable hyper-parameters $\theta$ and architectural parameters $\alpha$, to generate the augmented model M$\alpha$,$\theta$, wherein, the proposed method defines the optimization problem as $$w^{opt}_{\alpha,\theta} = \arg\min_{w} L(M_{\alpha,\theta}(w)) \tag{1}$$

$$\alpha^{opt}, \theta^{opt} = \arg\max_{\alpha,\theta} S(M_{\alpha,\theta}(w^{opt}_{\alpha,\theta})) \tag{2}$$

$$M^{opt}_{\alpha,\theta} = M_{\alpha^{opt},\theta^{opt}}(w^{opt}_{\alpha,\theta}) \tag{3}$$

where M$\alpha$,$\theta$ the augmented model obtained at a step of the architecture search, L is the training loss and S is the scoring metric the proposed method uses to compare the performance of trained augmented models. The proposed method formulates the neural architecture search to explore $\alpha$, $\theta$ values over a suitably designed discrete search space, which can be explored using various reward-based controller techniques. The resultant model architectures are trained and scored to generate an optimal model architecture, denoted by M$^{opt}_{\alpha,\theta}$, the method according to embodiments of the disclosure uses an AgingEvolution in the NAS controller (140). The NAS controller (140) randomly initializes a pool of models from the discrete search space and after having trained and scored them, mutates its decisions to iteratively select better pools of models to train and score.

Optimality is guaranteed, contingent upon choice of a suitable NAS Controller (140), once the entire search space is explored but is often attained earlier as well.

Architecture: There are two aspects of model architecture that need consideration, the base architecture that forms the backbone for the augmented model and the exit gates attached at different locations to prepare the augmented model. The optimization problem is defined in quite a general manner that does not rely upon any specific features of the baseline model. This allows us to choose base architectures without restrictions. Since a major purpose of the exit gates is to provide faster inference, following few considerations are to be noted 1. Exit gates need to be as simple as possible to ensure that they do not significantly increase the inference time and computational complexity of the base model itself.

2. Exit gate outputs need to be of the same shape as the base model output.

3. Exit gates can, in theory, be placed anywhere but the complexity of modern state-of-the-art models precludes us from feasibly implementing this while working with discrete NAS search spaces.

As indicated above, there is a trade-off involved when it comes to designing exit gates. Since the proposed method according to embodiments needs to match output shapes, the proposed method cannot keep trivially simple layers as exit gates but at the same time, the proposed method cannot afford to design complicated exit gates since that would increase inference latency, and model size. In order to meet higher demands of accuracy, modern deep learning models tend to contain hundreds of layers. To show this progression, while AlexNet has 20 layers 1, InceptionV3 has 313 layers and EfficientNet-B0 has 199 layers. Also, these models are often not used singly but as backbones for much larger models. This complexity poses a significant challenge for feasibly designing search spaces for performing NAS. Since search space sizes can grow exponentially with the number of model layers, the proposed method realizes that a naive design is not possible to solve the problem of figuring out exit gate locations. Instead, the problem may be made realizable by focusing on factors that increase significantly slowly in comparison with model complexities (or do not increase at all).

Formally, in order to keep the search space design feasible, the NN model may identify factors that grow at the order of O(log S) complexities, where S represents model size. The NN model needs to ensure this so that the search space size grows in a polynomial fashion rather than exponential manner. Practically, this translates to identifying salient points of interest in the base model that satisfy a significance threshold on a saliency score. The NN model may define saliency as the set of parameters defining a smaller search space that can capture the relevant features from a larger search space. For discrete search spaces based on model architectures, as employed by a AgingEvolution controller, this narrows down to a selection of parameters that are able to capture the significant features of the NAS search. Ideally, the NN model may use a measurement of saliency which is specific to both the problem and the base model architecture that is selected for the NN model and satisfies the complexity bound the user of the NN model define. Therefore, in the specific case, saliency would be a set of potential locations within the model where our exit gates could be placed. Considering the highly residual nature of the models 4 used in the proposed example (for example), the user of the NN model may choose the points of saliency as the locations where the residual connections merge into the main branch.

Early Exit Strategy: The augmented model $M\alpha,\theta$ prepared by the NAS controller (140) relies upon confidence measurement bounds to take a decision to exit. The augmented model, during training, keeps tracks of the confidence scores at each exit gate, which is used in calibration. Specifically, with a confidence metric Ci, the NN model may measure the class-wise confidence scores at each exit gate i. Once training is complete, decision confidence bounds are computed by the use of predictor functions shown in Equations 4 and 5.

$$T_{low} = f_{low}(C_0, C_1, \ldots, C_K) \tag{4}$$

$$T_{high} = f_{high}(C_0, C_1, \ldots, C_K) \tag{5}$$

where $f_{low}$ is the predictor function that yields the lower confidence threshold $T_{low}$, $f_{high}$ is the predictor function that yields the upper confidence threshold $T_{high}$, and K is the number of exit gates augmented to the model.

After the model has been trained and calibrated, the NN model may have a pair of threshold values $(T_{low}, T_{high})$. Given an input data sample D, the NN model may proceed along the model sequentially until the NN model encounters an exit gate. The NN model computes the confidence score at that exit gate which, if higher than $T_{high}$, shall exit with a positive decision, or, if lower than $T_{low}$, shall exit with a negative decision, or otherwise shall proceed along the model once again until it encounters the next exit gate. In this fashion, the NN model leverages the two confidence bounds to be able to both exit early for highly confident predictions (in case of inputs that the early exit gates are very certain of) and exit early for highly confident negative predictions (in case the input is not drawn from a population represented by the training dataset). The earlier the model takes an exit, the lower the inference time. With the help of fine-tuned predictor functions, the NN model can arrive at the most optimal augmented model architecture(s).

Figure 2A:
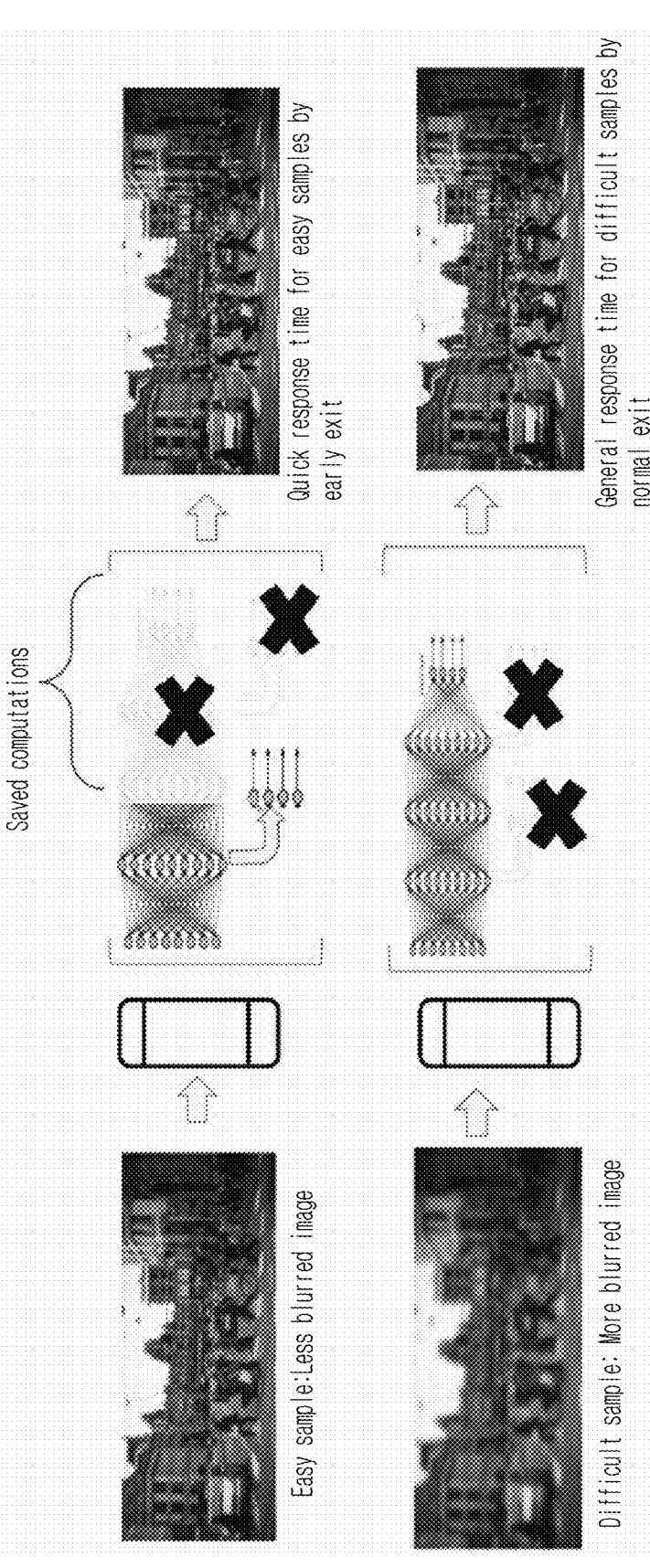
FIG. 2A is an example illustration in which an exit gate placement operation is depicted during a deblurring use-case, according to the embodiments as disclosed herein.

In an example, the exit gate placement operation is depicted during a deblurring use-case as shown in the FIG. 2A. In the FIG. 2A the aspect of saving computation i.e. early exiting, when there is an easy sample (less blurred image) is provided. There is no early exiting when the sample is difficult (more blurred image).

Figure 2B:
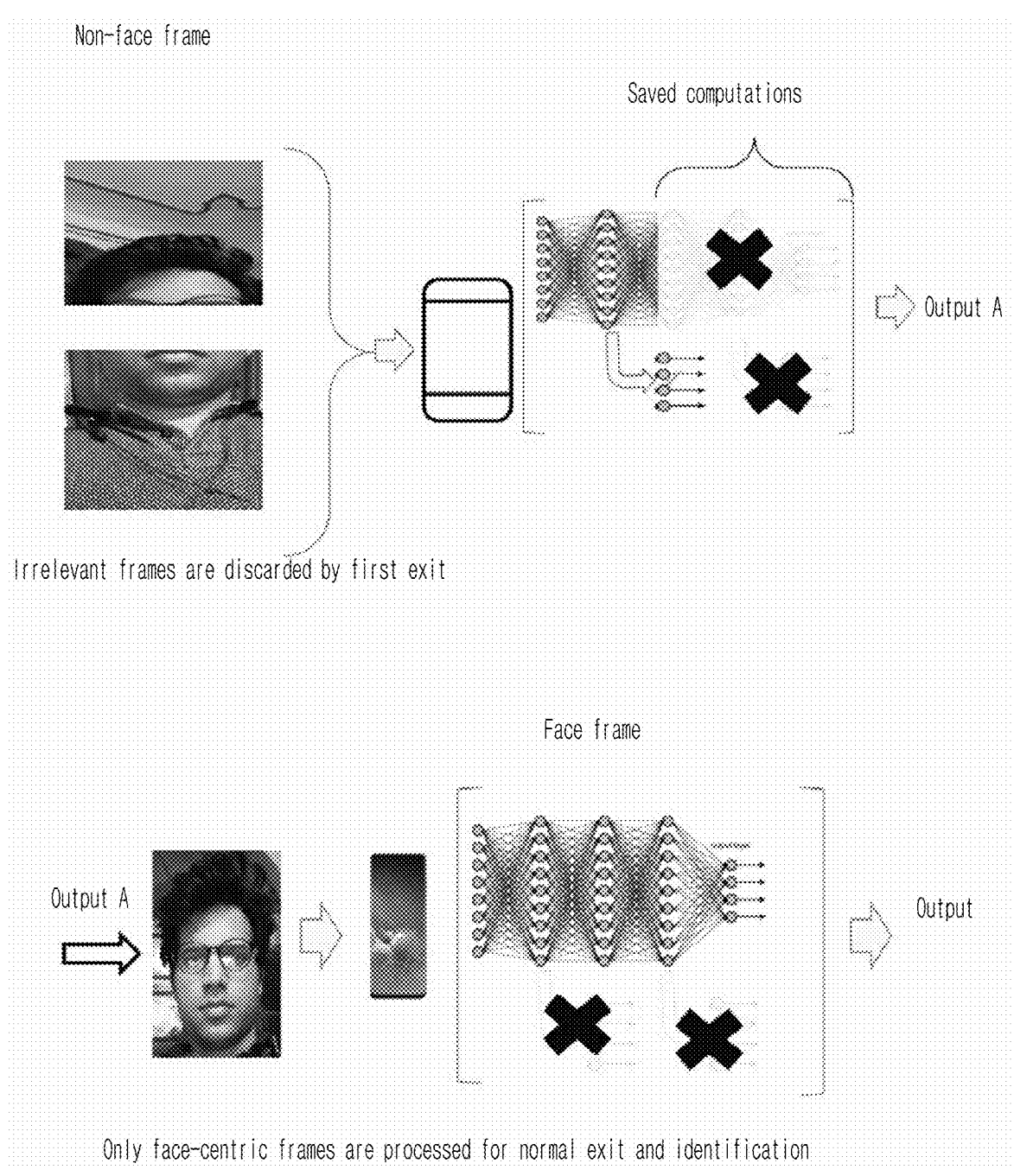
FIG. 2B is an example illustration in which an exit gate placement operation is depicted during a camera early state use-case, according to the embodiments as disclosed herein.

In another example, the exit gate placement operation is depicted during a camera early state use-case as shown in the FIG. 2B. Fast face recognition for unlocking an electronic device is performed when a clear image of a face is captured by a camera of the electronic device. The frame without face i.e. irrelevant frame will be processed up to first exit gate therefore computation time incurred because of processing irrelevant frame will be saved.

The NAS controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The reinforcement learning controller (150) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communication interface (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard disks, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 2 shows various hardware components of the electronic device (100), embodiments are not limited thereto. In other embodiments, the electronic device (100) may include less or more number of components. Further, the labels or names of the components are used only for illustrative purposes and do not limit the scope of the embodiment. One or more components can be combined together to perform the same or substantially the same function in the electronic device (100).

FIG. 3A and FIG. 3B are flow charts (S300) illustrating a method for generating the optimal neural network model, according to the embodiments as disclosed herein. The operations (S302-S330) are performed by the NAS controller (140)

At S302, the method includes determining the final output of the NN model by passing the input dataset through each layer of the plurality of layers of the NN model. At S304, the method includes identifying the set of layers of the plurality of layers of the NN model that produces the output that is close to the final output of the NN model. The determination of whether the output of each of the plurality of layers is close to the final output of the NN model is performed by computing a difference between each of the output of each of the plurality of layers and the final output, and comparing the difference with a preset threshold. If the difference is less than the preset threshold, the output of the corresponding layer is determined to be close to the final output. At S306, the method includes inputting the set of layers of the plurality of layers of the NN model, the type of at least one task to be performed by the electronic device (100) and the input dataset associated with the at least one task to the reinforcement learning controller (150).

At S308, the method includes determining the QoS requirement associated with the at least one task and hardware requirement associated with the at least one task based on the reinforcement learning performed by the reinforcement learning controller (150). At S310, the method includes performing the NAS based on a temperature factor on the set of layers of the plurality of layers of the NN model, wherein the temperature factor is greater than unity.

At S312, the method includes determining the at least one sequence of layers within the set of layers of the NN model providing an output confidence score greater than the output confidence score threshold based on the NAS, where the output confidence score threshold is determined based on the QoS requirement and the hardware requirement associated with the at least one task. At S314, the method includes determining the plurality of intermediate exit gates and the location of each of the plurality of intermediate exit gates within the set of layers.

At S316, the method includes determining intermediate outputs of the NN model by passing the input dataset through each intermediate exit gate of the plurality of intermediate exit gates. At S318, the method includes determining the accuracy score for each intermediate exit gate of the plurality of intermediate exit gates based on a comparison of the final output of the NN model with the intermediate output. At S320, the method includes identifying the earliest intermediate exit gate that produces the intermediate output close to the final output based on the accuracy score. The intermediate output is determined to be close to the final output when a difference between the intermediate output and the final output is within a preset threshold. Among the plurality of intermediate exit gates of the NN model, the exit gate which has the output within the preset threshold and which is closest to the input layer of the NN model may be identified as the earliest intermediate exit gate that produces the intermediate output close to the final output. The difference between the output of the intermediate exit gate and the final output may represent validation accuracy. The intermediate exit gate that is determined to be close to the final output is considered as having validation accuracy within a preset threshold. At S322, the method includes generating the optimal NN model by removing or dropping remaining layers of the plurality of layers and remaining intermediate exit gates of the plurality of intermediate exit gates located after the determined earliest intermediate exit gate. According to embodiments of the disclosure, the remaining layers may not exist in the NN model, or the connections to the remaining layers may be dropped while the remaining layers exist in the NN model.

At S324, the method includes receiving the test dataset. At S326, the method includes passing the test dataset through the optimal NN model. At S328, the method includes determining the multi-objective reward based on a pruning percentage and an accuracy degradation of the test dataset passed through the optimal NN model. At S330, the method includes providing the multi-objective reward to the reinforcement learning controller (150).

The proposed method provides the early exit mechanism that can be applied to any model to offer lower latency and power savings by processing the given input data point only as deep as necessary to get a confident decision. Further, the proposed method uses the neural architecture search to optimize the number of exit points and corresponding placements thereby providing an automated way to adopt the proposed setup on any given model. The confidence criteria governing the exit decisions is based on Softmax with temperature scaling and can be further improved to obtain stronger and robust exit decisions. Since NAS is often used in building models, incorporating exit blocks in NAS search space will enable designing 'early exit'-friendly networks.

Figure 4:
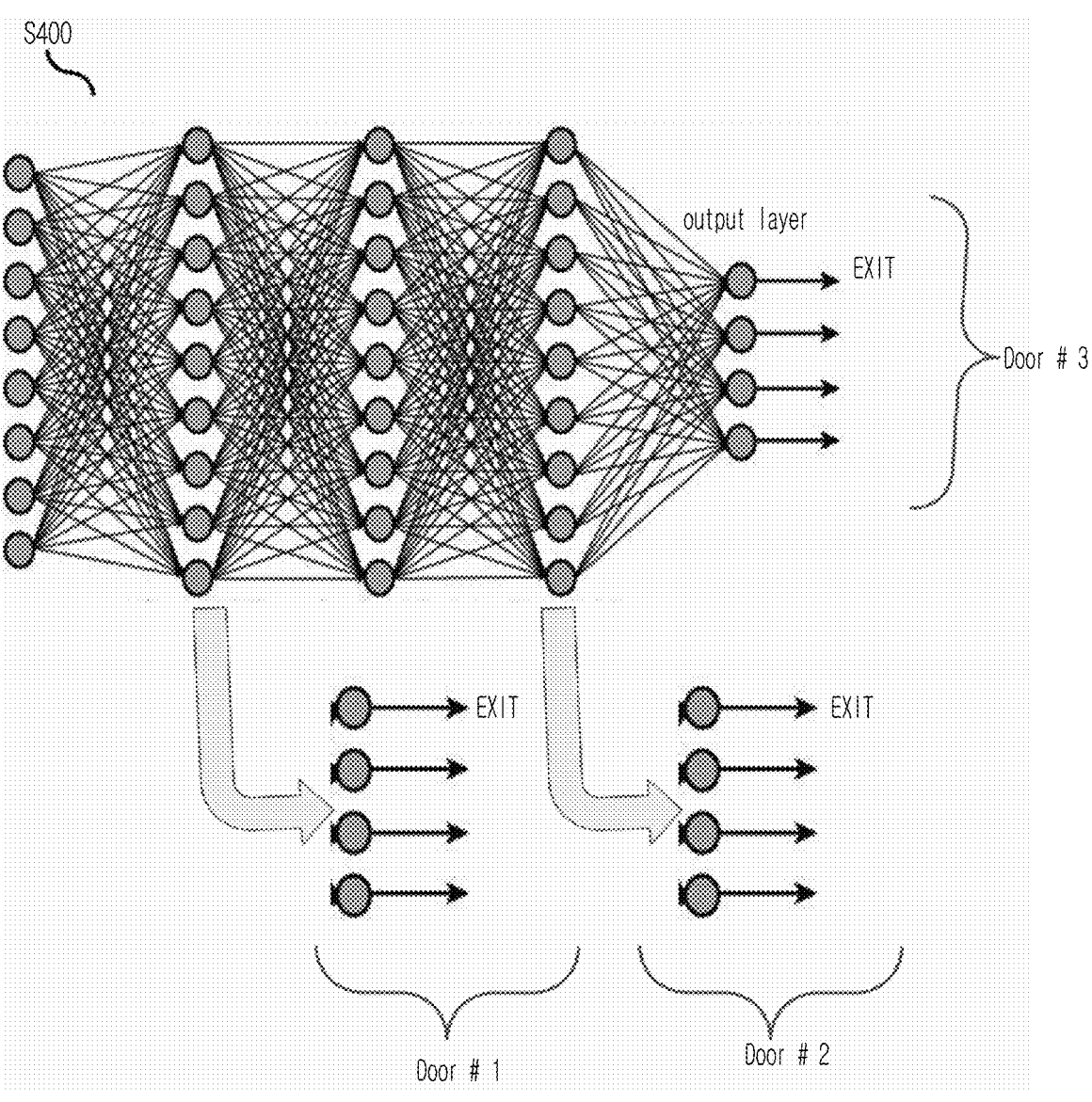
FIG. 4 is an example illustration in which an exit gate placement at the electronic device and non-terminal layers is depicted, according to the embodiments as disclosed herein.

FIG. 4 is an example illustration (S400) in which the exit gate placement at the electronic device (100) and non-terminal layers is depicted, according to the embodiments as disclosed herein.

Based on the proposed method, the early exit mechanism is depicted in which images or video frames can exit out of a non-terminal layer (i.e., a final output layer) in the AI model based on the content and the model's confidence in the decision it could make at that layer.

The proposed method obtains an optimal number of exit points and an optimal set of locations to place the exit points using Neural Architecture Search (NAS). Using the NAS optimized early exit mechanism, the method demonstrates the improvements in efficiency, obtained on image and video processing using open source datasets of varying complexities.

Video data often contain irrelevant frames (28) that may not offer useful insights relevant to the use-case and typically don't contain complex information. The proposed method provides that the decisions on such frames need not be taken at the final layer of the model but can be taken at earlier layers if the model can make a confident decision. This helps in reducing computations without adversely affecting the accuracy of the model. Another potential way to improve efficiency in a video use-case is to avoid processing information that is redundant across adjacent frames (1, 8) and only process the residual frame (obtained after eliminating the already processed information) which would exit early from the model in most scenarios. Image data processing can also benefit from early exiting mechanism due to varying complexity across image data points. An optimal configuration of the number of exit gates, and their locations, along with a strong proposed method for determining model uncertainty, can help in improving efficiency over the traditional method of running data through all layers blindly. Computing model uncertainty reliably is critical to the proposed method since early exit regulations are governed by the confidence in the model's decision at the exit gates. Employing softmax outputs as proxies for model confidence is not guaranteed to be reliable by itself. The lack of connectivity between softmax outputs and model confidence poses challenges in applying this mechanism for real-world problems. Therefore, the proposed method adopts softmax with temperature scaling which helps in softening the neural network outputs so as to make them better reflect true probability distributions.

Figure 5:
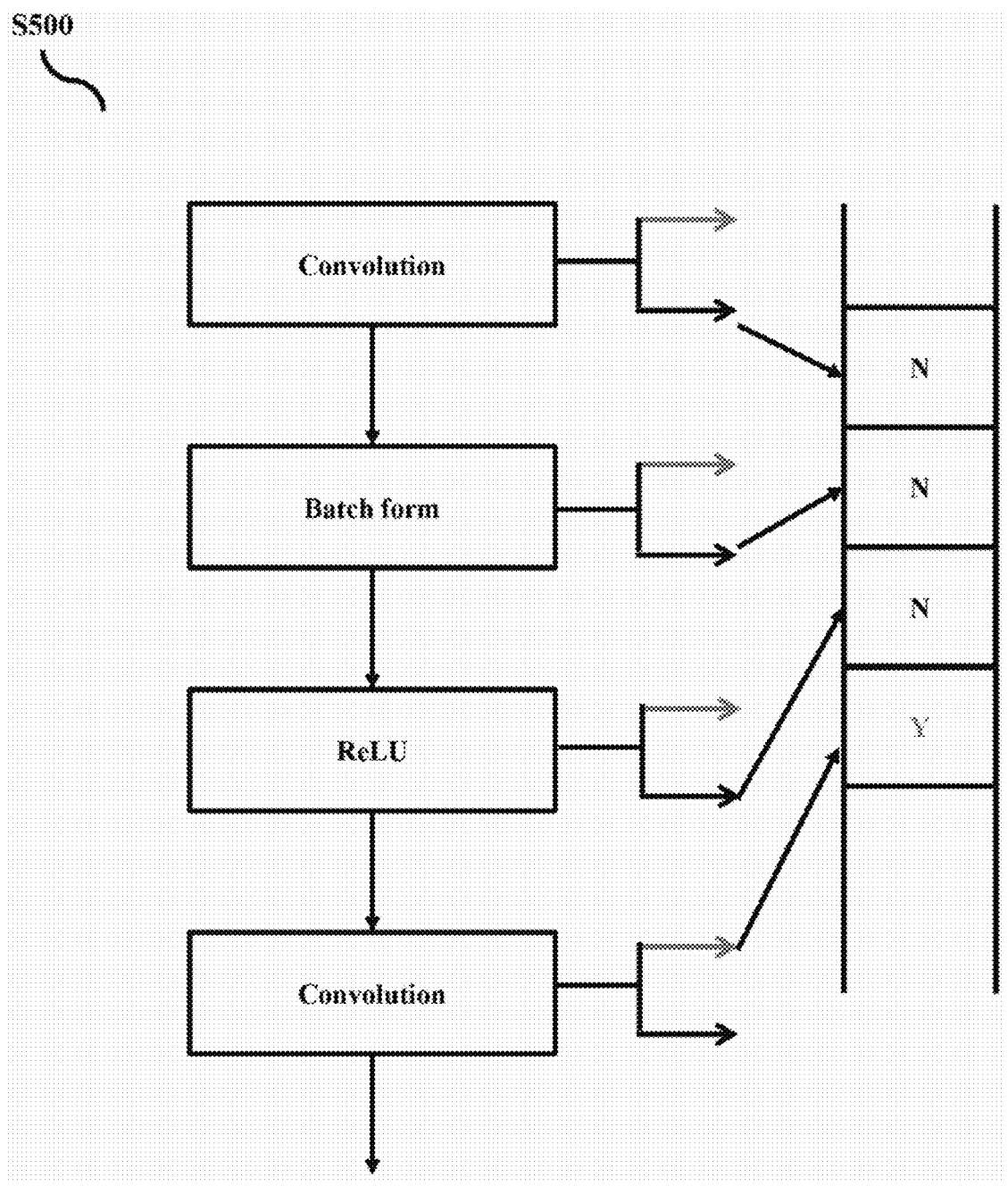
FIG. 5 is an example illustration in which meta model structure is depicted, according to the embodiments as disclosed herein.

FIG. 5 is an example illustration (S500) in which meta model structure is depicted, according to the embodiments as disclosed herein. At each layer, the NAS controller (140) makes a decision regarding whether an exit gate should be placed at that point or not.

Search Space: In an example, the NAS search space is generated by way of a collection of single-output multi-choice arrays. In the experiments, the NN model may form each of these arrays as a binary choice between placing an exit gate or not at a given position, as illustrated in FIG. 5. This generates a search space that grows exponentially with the number of potential positions for placing the exit gates, illustrated in FIG. 9 (indicated as S900). The NN model solves this problem by identifying and exploiting salient points present in the base architectures. For practical design, the NN model is configured to have O(log S) exit points, with S being 175 for a first convolutional neural network (e.g., ResNet50) and 152 for a second convolutional neural network (MobileNetV2²). Keeping this in mind, the size of the search space without saliency comes out to be $2^{175}$ and $2^{152}$ while, if the NN model uses saliency, it comes out to be 175k and 152k respectively (where k is a simple linear scaling factor). Observing the model structures, the user of the NN model may notice the most significant features of the models are their fundamental building blocks, including 16 and 17 residual connections of the first convolutional neural network and the second convolutional neural network, respectively. However, the user of the NN model can theoretically choose any other collection of points based on a suitable saliency measure.

Exit Gate Architecture: In an example, each of the first convolutional neural network and the second convolutional neural network may include a sequence of Convolution, Batch Normalization, and Activation layers. The NN model may choose this as a refinement block for the exit gate. Furthermore, the NAS controller (140) decides how many of these sequences to add per exit gate. This lets the NAS balance between the complexity, and hence inference time, of the exit gates with the inference accuracy of the augmented model architecture. The collection of these sequential blocks, however, do not provide the correct output shape. Hence, the outputs from the sequential layers are further processed by pooling, followed by flattening the tensors and then adding a fully connected layer to map the flattened tensors to the correct output shape, Exit Decision Criterion: In an example, the baseline model outputs are augmented with temperature controlled Softmax to ascertain a measure of confidence for class selection. Softmax predictive probabilities cannot be interpreted as model confidence since a model can be uncertain in its predictions even with a high softmax output. Using temperature, the softmax classifier helps improve the reliability by making it confidence-calibrated. Temperature softens the probabilities—extreme probabilities are more reduced than the smaller probabilities. The temperature value is typically set to 1 in traditional softmax usage but in the experiments, the NN model may set the temperature value to a higher value of 5 to smooth out the softmax distribution. Furthermore, since the task is multi-class classification, the NN model may use cross-entropy loss along with L1 regularization on the model (and exit gate) outputs for training. During training, the NN model keeps track of the per-class output values from the base model output. The NN model then passes this along to predictor functions, which formulate $\mu c+0.5\sigma c$, where $\mu c$ is the mean and $\sigma c$ is the standard deviation of the output vector for class c, for the upper threshold predictor function as it provides the best representation of the classification data. The NN model may have a lower threshold (for example, that is manually set via a user input) instead of the lower threshold predictor function to demonstrate the flexibility of this method to be able to use threshold from different independent functions.

In an example, based on the proposed method, experiments are performed on CIFAR-10, CIFAR-100, CalTech-101, and 236 CalTech-256 using an NVIDIA TESLA P40 GPU server. Datasets are chosen to ensure that experimentation is performed on problems with different complexities. For example, CIFAR-100 and CalTech256 are complex problems to solve, especially for the architectures of the choice. The NN model may be trained using the NAS controller (140) to identify optimal number of exit points and their corresponding placements. The latency and accuracy values are tabulated in Table 1 and profile with respect to exit gates is characterized in FIG. 10 (indicated as S1000) for ResNet50 and in FIG. 11 (indicated as S1100) for MobileNetV2 backbone. The NN model may monitor or observe that, on the target datasets, the overall validation accuracy does not deviate significantly from the baseline. On the other hand, the NN model may notice significant reduction in average inference latency. Augmented models generated are scored on test datasets based on the accuracy they provide while functioning as they would during deployment.

Figure 12:
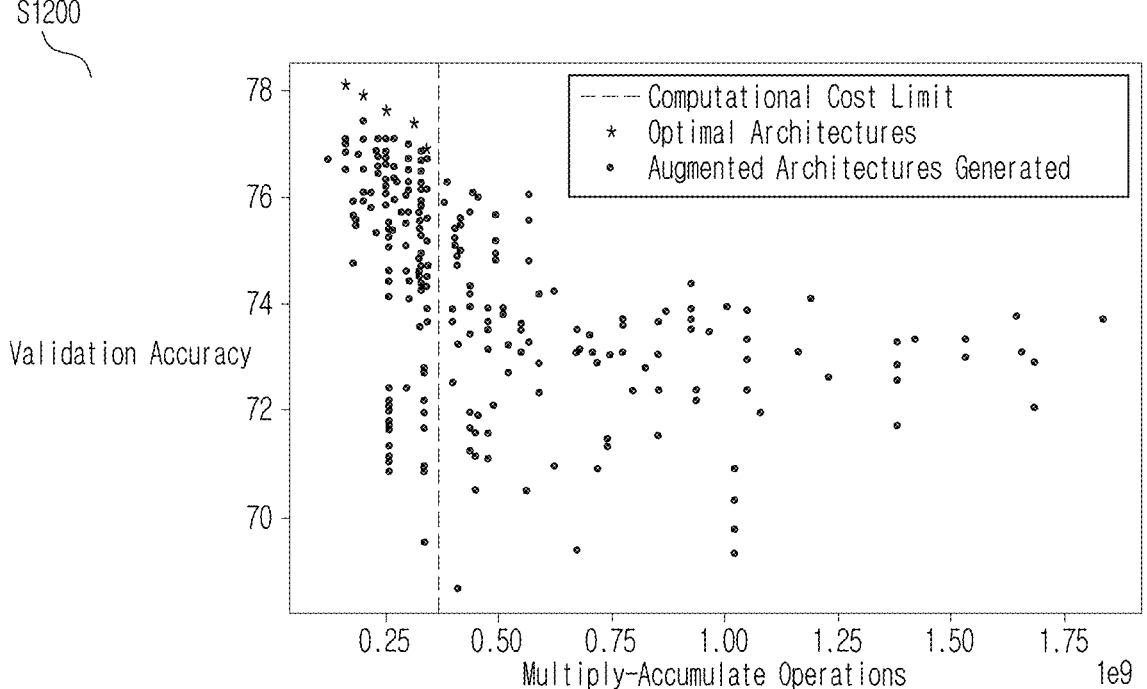
FIG. 12 is an example graph in which pareto-optimality boundary of NAS search is depicted, according to the embodiments as disclosed herein.

As shown in FIG. 12 (indicated as S1200), the NAS controller (140) generates a large population of models with different accuracies and computational requirements (measured in the form of Multiply-Accumulate Operations). The goal is to select the models at the pareto-optimality boundary, marked in the FIG. 12, subject to user-defined constraints, either in the way of accuracy scores and/or computational requirements. After validating, the NN model may also have latency measurements and exit distributions available with us. That is, the NN model may obtain the effective average inference latency Li by using each augmented model along with an array Ei representing the amount of exits taken for the validation dataset. The NN model can leverage this information to further limit the architectures of the NN model.

The cardinality of the exits need not correspond exactly with their order. For example, between two different augmented architectures for the same baseline architecture, the first exit gate could occur at different locations.

TABLE 1

| | ResNet50: Base | | ResNet50: Augmented | |
| --- | --- | --- | --- | --- |
| Dataset | Accuracy (%) | Latency (ms) | Accuracy (%) | Latency (ms) |
| CIFAR-10 | 82.73 | 7.27 | 85.28 | 1.78 |
| CIFAR-100 | 51.95 | 7.32 | 24.57 | 2.82 |
| CalTech-101 | 63.50 | 7.40 | 78.07 | 1.43 |
| CalTech-256 | 26.58 | 7.34 | 35.23 | 2.41 |

TABLE 1-continued

| | MobileNetV2: Base | | MobileNetV2: Augmented | |
| --- | --- | --- | --- | --- |
| Dataset | Accuracy (%) | Latency (ms) | Accuracy (%) | Latency (ms) |
| CIFAR-10 | 81.08 | 5.22 | 84.14 | 2.24 |
| CIFAR-100 | 51.61 | 5.62 | 49.76 | 2.17 |
| CalTech-101 | 50.61 | 5.25 | 61.52 | 2.83 |
| CalTech-256 | 21.01 | 5.51 | 10.2 | 2.41 |

Table 2 shows the interference latency gain on a frame-by-frame analysis of a simulated video with Augmented architectures. The video frames include data from imagenette (Apache2.0 Licence) for MobileNetV2, and cifar10 for ResNet50 along with custom-frames with low entropy. The optimal placement of exit gates for MobileNetV2 were found to be in the latter part of the model due to high complexity in training data which lead to relatively lower savings. However, ResNet50 has simpler datasets which allow the low entropy frames to exit early.

TABLE 2

| Architecture | Base Model Latency $l_b$ (seconds) | Total Frames | Irrelevant Frames | Augmented Model Latency $l_a$ (seconds) | Speed-Pp Obtained $\left(\frac{l_b}{l_a}\right)$ |
| --- | --- | --- | --- | --- | --- |
| ResNet50 | 70.19 | 10000 | 0% | 22.35 | 3.14 |
| | | | 10% | 21.95 | 3.19 |
| | | | 30% | 21.12 | 3.32 |
| | | | 50% | 20.54 | 3.41 |
| | | | 75% | 20.73 | 3.38 |
| | | | 0% | 24.63 | 2.21 |
| | | | 10% | 24.45 | 2.23 |
| MobileNetV2 | 54.67 | 10000 | 30% | 22.92 | 2.38 |
| | | | 50% | 22.31 | 2.45 |
| | | | 75% | 21.32 | 2.56 |

Table 3 shows the Model Compression by layer pruning. Results obtained using MobileNetV2 on CIFAR-10 data at each Exit Gate by removing or dropping all the succeeding layers. Note that our augmented model has almost 50% higher FLOPS than the base model. This is due to how PyTorch evaluates models sequentially. Despite this added cost, we can save a lot of computations by our proposed pruning.

TABLE 3

| Model | Accuracy (%) | Latency (s) | FLOPS (M) |
| --- | --- | --- | --- |
| Base | 81.08 | 5.22 | 6.4 |
| Augmented | 83.4 | 2.35 | 9.9 |
| Exit 1 | 82.62 | 2.09 | 2.4 |
| Exit 2 | 83.07 | 2.10 | 3.2 |
| Exit 3 | 83.36 | 2.11 | 3.8 |
| Exit 4 | 83.44 | 2.15 | 4.6 |
| Exit 5 | 83.57 | 2.16 | 7.6 |
| Exit 6 | 83.45 | 2.14 | 8.9 |
| Exit 7 | 83.31 | 2.11 | 9.9 |

Figure 6:
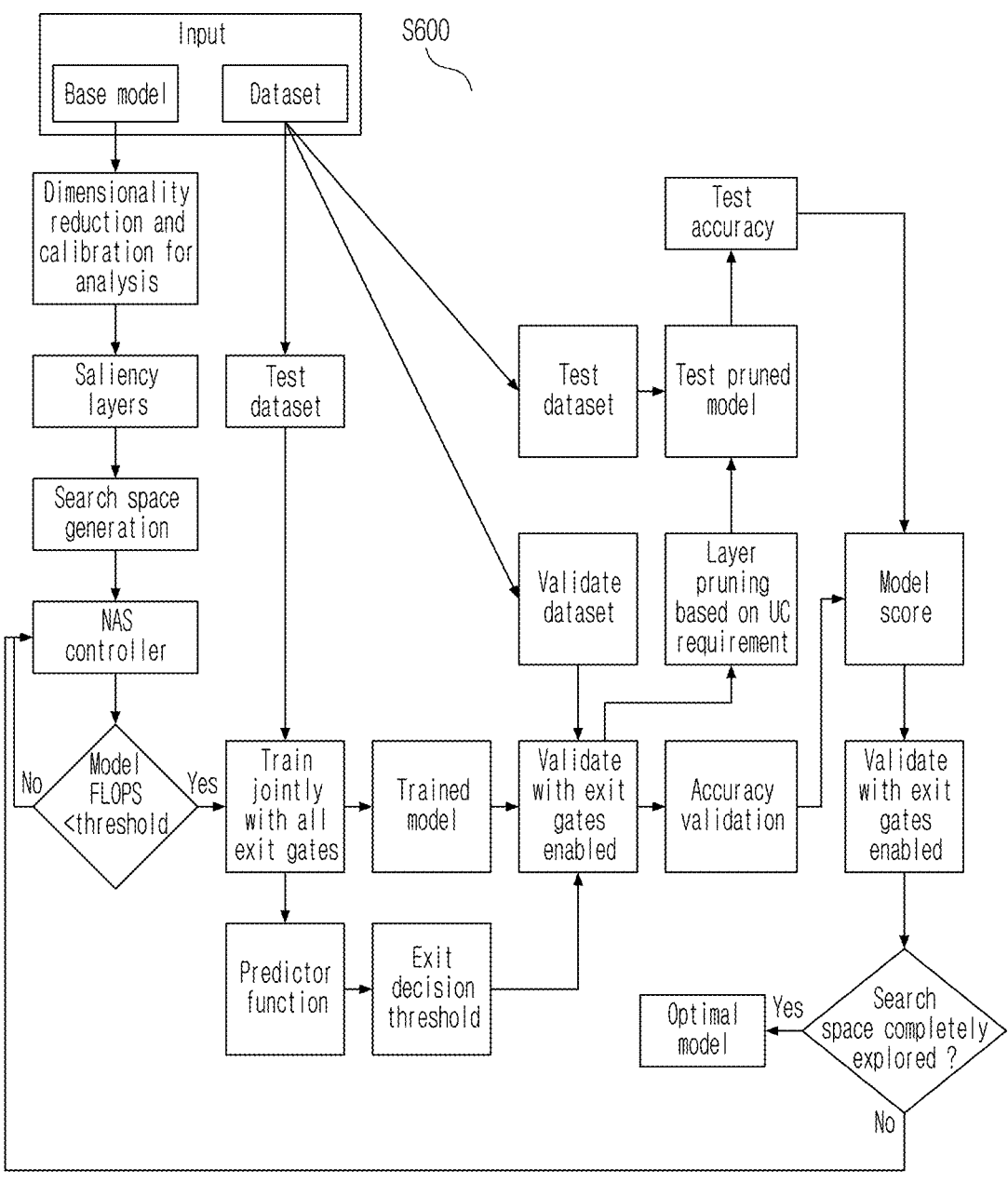
FIG. 6 is an example illustration in which a framework for exit gate augmentation with layer pruning is depicted, according to the embodiments as disclosed herein.

FIG. 6 is an example illustration (S600) in which a framework for exit gate augmentation with layer pruning is depicted, according to the embodiments as disclosed herein. The step-by-step procedure followed in the framework for exit gate augmentation with layer pruning is depicted.

Figure 7:
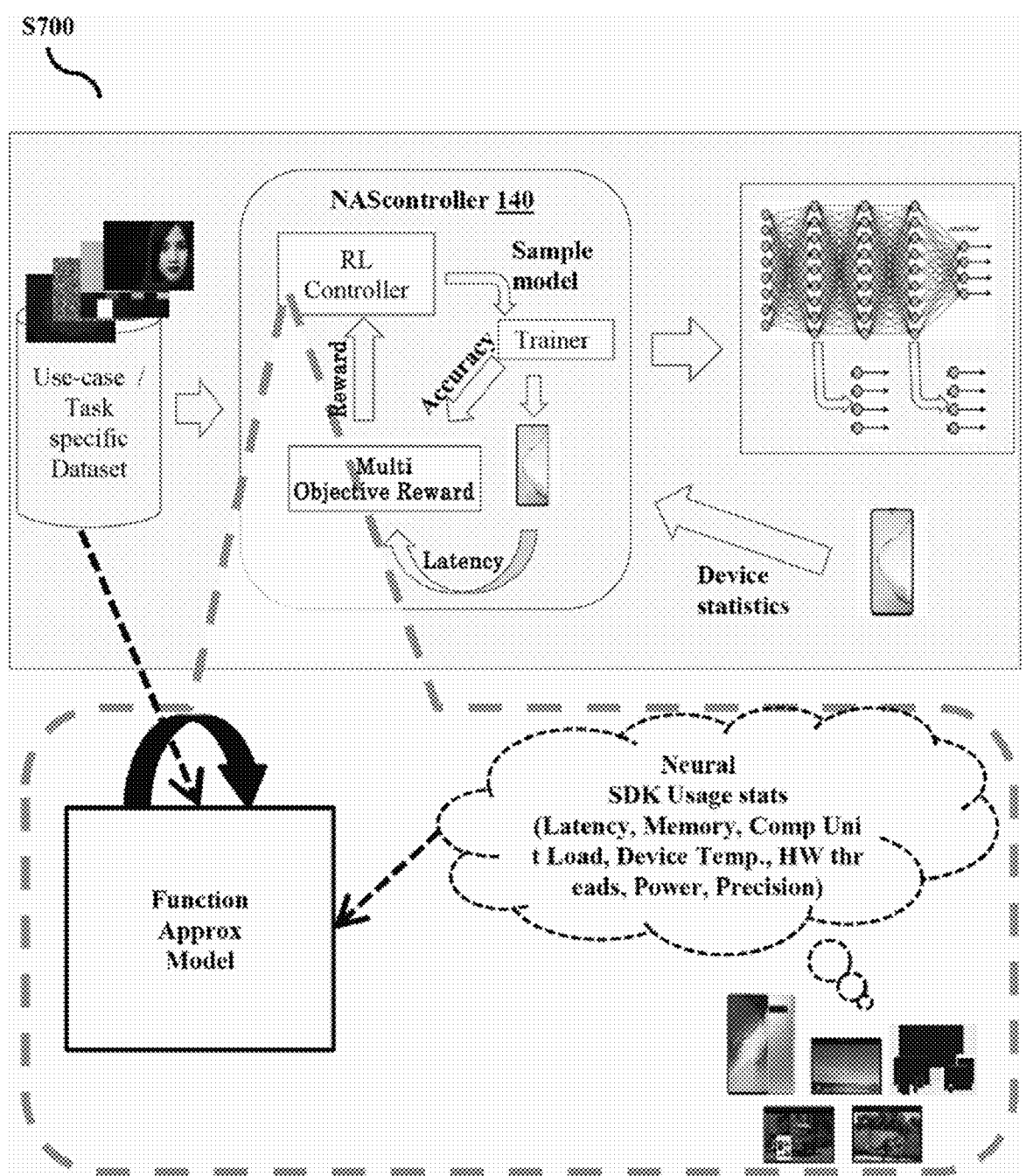
FIG. 7 is an example illustration in which operations of the NAS controller is depicted, according to the embodiments as disclosed herein.

FIG. 7 is an example illustration (S700) in which operations of the NAS controller (140) is depicted, according to the embodiments as disclosed herein. The operations and functions of the NAS controller (140) is explained in connection with the FIG. 2, FIG. 3A and FIG. 3B. The NAS controller (140) designs the optimal intermediate exits. The function approximator model inside that reinforcement learning controller (150) of the NAS controller (140) will be learned from data in order to account for the hardware and parameters as well as inference quality requirements. The output optimal policy of the controller will thus give us the optimal arrangement and number of intermediate exit gates.

Figure 8:
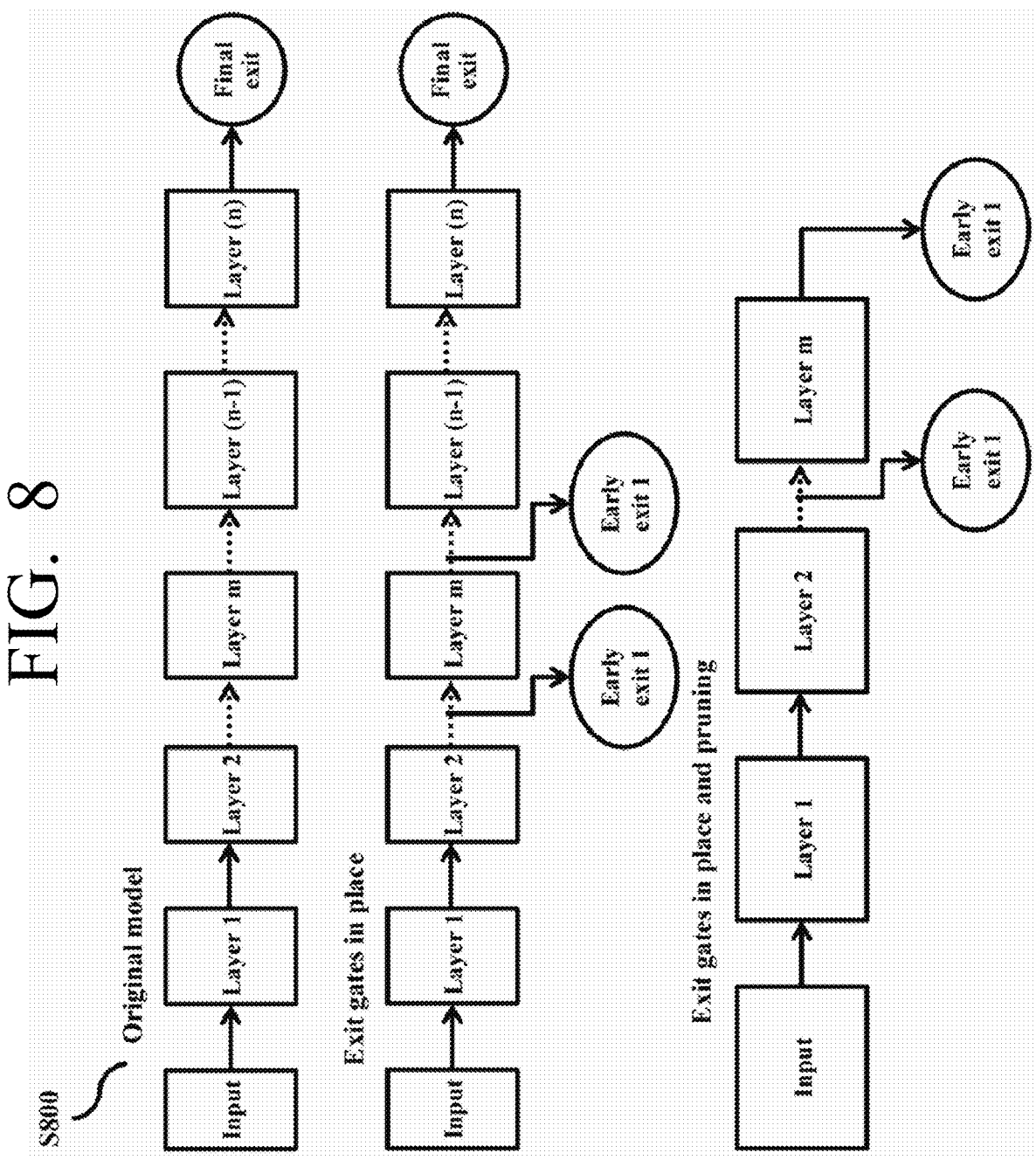
FIG. 8 is an example illustration in which an exit aware training is depicted, according to the embodiments as disclosed herein.
Figure 9:
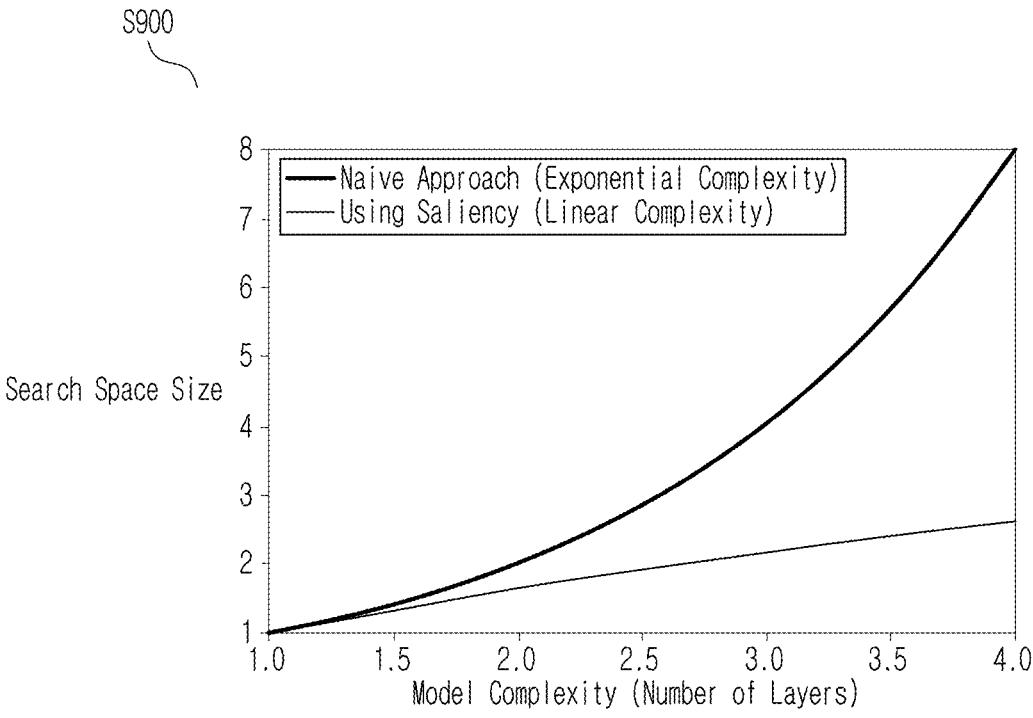
FIG. 9 is an example graph in which search space complexity with and without saliency is depicted, according to the embodiments as disclosed herein.
Figure 10:
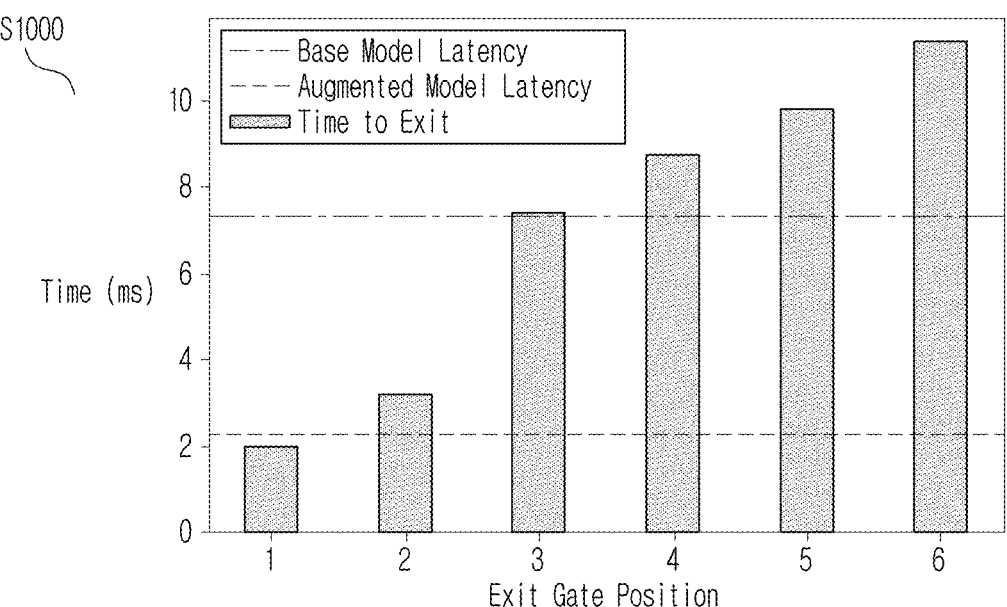
FIG. 10 is an example graph in which latency profile at different exit points for augmented models using a convolutional neural network is depicted, according to the embodiments as disclosed herein.
Figure 11:
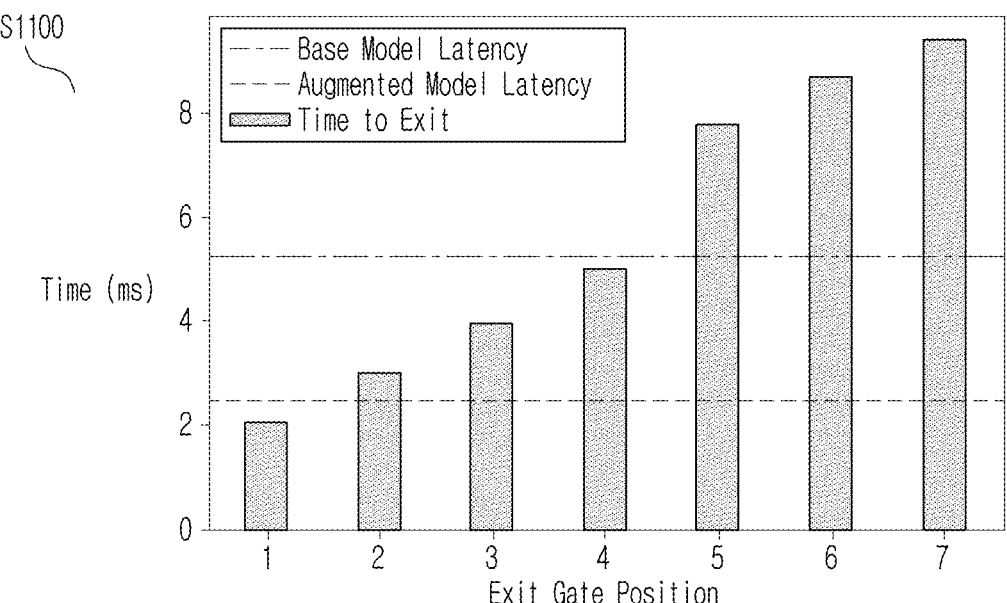
FIG. 11 is an example graph in which latency profile at different exit points for augmented models using a Mobile-NetV2 Backbone is depicted, according to the embodiments as disclosed herein.

FIG. 8 is an example illustration (S800) in which an exit aware training is depicted, according to the embodiments as disclosed herein.

Exit Aware Training: The training of the architecture needs happens jointly with the dynamically learned exit points so that each exit point should come across enough fine and coarse features in order to maintain the performance level.

$$L(\hat{y}, y; \theta) = -\frac{1}{|C|}\sum_{c \in C} y_c \log \hat{y}_c, \tag{6}$$

$$\hat{y} = \text{softmax}\ (z) = \frac{\exp(z)}{\sum_{c \in C} \exp(z_c)}, \tag{7}$$

$$z = f_{exit_n}(x; \theta), \tag{8}$$

where C is the classes, n is the number of exit gates, $\hat{y}$ is the observed output, y is the expected output.

The parameters of the learned intermediate exits are dependent on both target precision and quality of output, which in turn depends on the task as well as the hardware configuration. This problem can be solved by the proposed joint optimization of the intermediate exits structure and the parameter space Given a preset maximum threshold of accuracy degradation as compared to the baseline model, the earliest exit gate of the NN model which has a validation accuracy within the specified threshold, may be selected in configuring the NN model. The NN model may prune away all model layers after the selected exit gate and set this exit gate as the model output layer.

Figure 13:
FIG. 13 and FIG. 14 are example illustrations in which inference gain in a video use-cases are depicted, according to the embodiments as disclosed herein.
Figure 14:
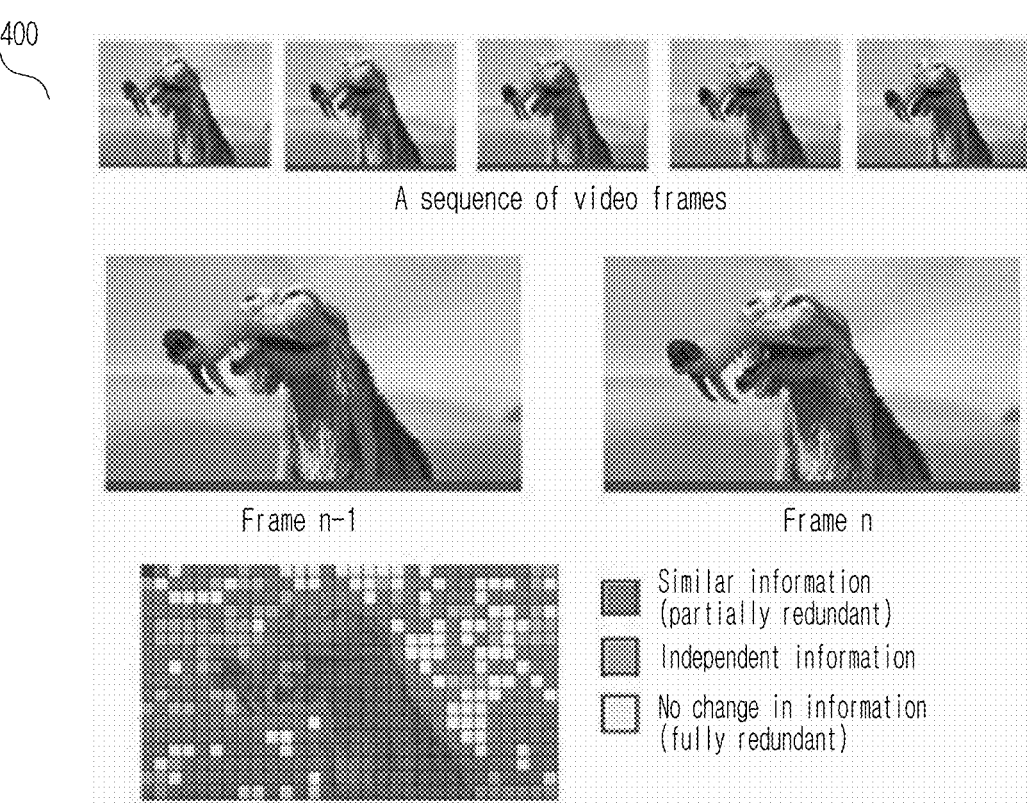

FIG. 13 and FIG. 14 are example illustrations (S1300 and S1400) in which inference gain in a video use-cases are depicted, according to the embodiments as disclosed herein.

In a video, frames with irrelevant information or information with less complexity is found. The determination of whether a video frame contains relevant information or not may be performed via an image classification neural network model that determines a classification (e.g., a cat, a dog, a human face, and the like) of an image. If the classification of the image matches a target classification (e.g., a human face), the video frame may be determined as being relevant. Consecutive frames from a video generally contain redundant information in which case a residual frame can be processed instead of processing the same information. Processing residual frames (with minimal information) and irrelevant frames in 'anytime' framework leads to latency and power savings A simulated video with irrelevant frames illustrates latency savings. Higher the number of irrelevant frames, greater is the savings

TABLE 4

| ResNet50 Baseline (Latency = 70.19 ms) | | |
| --- | --- | --- |
| % Irrelevant Frames | Anytime Model Latency (ms) | Speedup (Base/Anytime) |
| 0% | 22.35 | 3.14 |
| 10% | 21.95 | 3.19 |
| 30% | 21.12 | 3.32 |
| 50% | 20.54 | 3.41 |
| 75% | 20.73 | 3.38 |

TABLE 5

| MobileNetV2 Baseline (Latency = 54.67 ms) | | |
| --- | --- | --- |
| % Irrelevant Frames | Anytime Model Latency (ms) | Speedup (Base/Anytime) |
| 0% | 24.63 | 2.21 |
| 10% | 24.45 | 2.23 |
| 30% | 22.92 | 2.38 |
| 50% | 22.31 | 2.45 |
| 75% | 21.32 | 2.56 |

The various actions, acts, blocks, steps, or the like in the flow charts (S300) may be performed in the order presented, in a different order or simultaneously. Further, in some embodiments, some of the actions, acts, blocks, steps, or the like may be omitted, added, modified, skipped, or the like without departing from the scope of the embodiment.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device, wherein the method comprises:

receiving an image and a request for performing facial recognition;

determining whether the image comprises the facial image;

identifying a set of layers, which produces an output whose difference from a final output of the NN model is less than a preset threshold, among a plurality of layers of the NN model;

identifying a plurality of intermediate exit gates and a location of each of the plurality of intermediate exit gates within the set of layers;

obtaining intermediate outputs of the NN model by passing an input dataset through each of the plurality of intermediate exit gates;

obtaining an accuracy score for each of the plurality of intermediate exit gates based on a comparison of the final output of the NN model with each of the intermediate outputs;

identifying an earliest intermediate exit gate whose accuracy score is within a preset accuracy score based on the location of each of the plurality of intermediate exit gates within the set of layers, among the plurality of intermediate exit gates, and based on a determination of whether the image comprises the facial image, wherein the earliest intermediate exit gate is closest to an input layer of the NN model among at least one intermediate exit gate whose accuracy score is within the preset accuracy score; and generating the NN model by removing or dropping remaining layers of the plurality of layers and remaining intermediate exit gates of the plurality of intermediate exit gates located after the determined earliest intermediate exit gate.

2. The method as claimed in claim 1, wherein the identifying the set of layers of the plurality of layers of the NN model comprises:

determining the final output of the NN model by passing the input dataset through each layer of the plurality of layers of the NN model; and identifying the set of layers which produces the output whose difference from the final output of the NN model is less than the preset threshold, among the plurality of layers of the NN model.

3. The method as claimed in claim 1, wherein the determining the plurality of intermediate exit gates and the location of each of the plurality of intermediate exit gates within the set of layers comprises:

determining a quality of service (QoS) requirement associated with at least one task and a hardware requirement associated with the at least one task based on a reinforcement learning;

performing a neural architecture search (NAS) based on a temperature factor on the set of layers of the plurality of layers of the NN model, wherein the temperature factor is greater than unity;

determining, at least one sequence of layers within the set of layers of the NN model providing an output confidence score greater than an output confidence score threshold based on the NAS, wherein the output confidence score threshold is determined based on the QoS requirement and the hardware requirement associated with the at least one task; and determining the plurality of intermediate exit gates and the location of each of the plurality of intermediate exit gates within the set of layers.

4. The method as claimed in claim 1, further comprises:

receiving a test dataset;

passing the test dataset through the NN model; and determining a multi-objective reward based on a pruning percentage and an accuracy degradation of the test dataset passed through the NN model.

5. The method as claimed in claim 1, wherein the earliest intermediate exit gate is an intermediate exit gate in the set of layers providing a highest accuracy score, among the plurality of intermediate exit gates.

6. The method of claim 1, wherein a number of the remaining layers and a number of the remaining intermediate exit gates to be removed or dropped change according to the determination of whether the image comprises the facial image.

7. An electronic device for generating a neural network (NN) model, wherein the electronic device comprises:

at least one memory storing instructions; and at least one processor configured to execute the instructions to:

receive an image and a request for performing facial recognition;

determine whether the image comprises the facial image identify a set of layers, which produces an output whose difference from a final output of the NN model is less than a preset threshold, among a plurality of layers of the NN model;

identify a plurality of intermediate exit gates and a location of each of the plurality of intermediate exit gates within the set of layers;

obtain intermediate outputs of the NN model by passing an input dataset through each intermediate exit gate of the plurality of intermediate exit gates;

obtain an accuracy score for each of the plurality of intermediate exit gates based on a comparison of the final output of the NN model with each of the intermediate outputs;

identify an earliest intermediate exit gate whose accuracy score is within a preset accuracy score based on the location of each of the plurality of intermediate exit gates within the set of layers, among the plurality of intermediate exit gates, and based on a determination of whether the image comprises the facial image, wherein the earliest intermediate exit gate is closest to an input layer of the NN model among at least one intermediate exit gate whose accuracy score is within the preset accuracy score; and generate the NN model by removing or dropping remaining layers of the plurality of layers and remaining intermediate exit gates of the plurality of intermediate exit gates located after the determined earliest intermediate exit gate.

8. The electronic device as claimed in claim 7, wherein the at least one processor is further configured to execute the instructions to:

determine the final output of the NN model by passing the input dataset through each layer of the plurality of layers of the NN model; and identify the set of layers, which produces the output whose difference from the final output of the NN model is less than the preset threshold, among the plurality of layers of the NN model.

9. The electronic device as claimed in claim 7, wherein the at least one processor is further configured to execute the instructions to:

determine a quality of service (QoS) requirement associated with a at least one task and a hardware requirement associated with the at least one task based on a reinforcement learning performed;

perform a neural architecture search (NAS) based on a temperature factor on the set of layers of the plurality of layers of the NN model, wherein the temperature factor is greater than unity;

determine at least one sequence of layers within the set of layers of the NN model providing an output confidence score greater than an output confidence score threshold based on the NAS, wherein the output confidence score threshold is determined based on the QoS requirement and the hardware requirement associated with the at least one task; and determine the plurality of intermediate exit gates and the location of each of the plurality of intermediate exit gates within the set of layers.

10. The electronic device as claimed in claim 7, wherein the at least one processor is further configured to execute the instructions to:

receive a test dataset;

pass the test dataset through the NN model; and determine a multi-objective reward based on a pruning percentage and an accuracy degradation of the test dataset passed through the NN model.

11. The electronic device as claimed in claim 7, wherein the earliest intermediate exit gate is an intermediate exit gate in the set of layers providing a highest accuracy score, among the plurality of intermediate exit gates.

12. The electronic device of claim 7, wherein a number of the remaining layers and a number of the remaining intermediate exit gates to be removed or dropped change according to the determination of whether the image comprises the facial image.

13. A non-transitory computer-readable storage medium storing a program that is executable by at least one processor to perform a method for generating a neural network (NN) model, the method comprising:

receiving an image and a request for performing facial recognition;

determining whether the image comprises the facial image;

identifying a set of layers, which produces an output whose difference from a final output of the NN model is less than a preset threshold, among a plurality of layers of the NN model;

identifying a plurality of intermediate exit gates and a location of each of the plurality of intermediate exit gates within the set of layers;

obtaining intermediate outputs of the NN model by passing an input dataset through each of the plurality of intermediate exit gates;

obtaining an accuracy score for each of the plurality of intermediate exit gates based on a comparison of the final output of the NN model with each of the intermediate outputs;

identifying an earliest intermediate exit gate whose accuracy score is within a preset accuracy score based on the location of each of the plurality of intermediate exit gates within the set of layers, among the plurality of intermediate exit gates, and based on a determination of whether the image comprises the facial image, wherein the earliest intermediate exit gate is closest to an input layer of the NN model among at least one intermediate exit gate whose accuracy score is within the preset accuracy score; and generating the NN model by removing or dropping remaining layers of the plurality of layers and remaining intermediate exit gates of the plurality of intermediate exit gates located after the determined earliest intermediate exit gate.

14. The non-transitory computer-readable storage medium of claim 13, wherein the identifying the set of layers of the plurality of layers of the NN model comprises:

determining the final output of the NN model by passing the input dataset through each layer of the plurality of layers of the NN model; and identifying the set of layers which produces the output whose difference from the final output of the NN model is less than the preset threshold, among the plurality of layers of the NN model.

15. The non-transitory computer-readable storage medium of claim 13, wherein the determining the plurality of intermediate exit gates and the location of each of the plurality of intermediate exit gates within the set of layers comprises:

determining a quality of service (QoS) requirement associated with at least one task and a hardware requirement associated with the at least one task based on a reinforcement learning;

performing a neural architecture search (NAS) based on a temperature factor on the set of layers of the plurality of layers of the NN model, wherein the temperature factor is greater than unity;

determining, at least one sequence of layers within the set of layers of the NN model providing an output confidence score greater than an output confidence score threshold based on the NAS, wherein the output confidence score threshold is determined based on the QoS requirement and the hardware requirement associated with the at least one task; and determining the plurality of intermediate exit gates and the location of each of the plurality of intermediate exit gates within the set of layers.

16. The non-transitory computer-readable storage medium of claim 13, wherein the method further comprises:

receiving a test dataset;

passing the test dataset through the NN model; and determining a multi-objective reward based on a pruning percentage and an accuracy degradation of the test dataset passed through the NN model.

17. The non-transitory computer-readable storage medium of claim 13, wherein the earliest intermediate exit gate is an intermediate exit gate in the set of layers providing a highest accuracy score, among the plurality of intermediate exit gates.

* * * * *